(12) United States Patent
Lau

(10) Patent No.: US 9,185,992 B2
(45) Date of Patent: Nov. 17, 2015

(54) CONNECTING STRUCTURE FOR INFLATABLE PRODUCTS

(71) Applicant: Sun Pleasure Co., Limited, Kowloon (HK)

(72) Inventor: Vincent W. S. Lau, Kowloon (HK)

(73) Assignee: Sun Pleasure Co., Ltd., Hong Kong (HK)

( * ) Notice: Subject to any disclaimer, the term of this patent is extended or adjusted under 35 U.S.C. 154(b) by 0 days.

(21) Appl. No.: 14/519,953

(22) Filed: Oct. 21, 2014

(65) Prior Publication Data

US 2015/0157133 A1    Jun. 11, 2015

(30) Foreign Application Priority Data

Dec. 9, 2013  (CN) .......................... 2013 1 0665304
Dec. 9, 2013  (CN) .......................... 2013 1 0665370
Jul. 8, 2014  (CN) ...................... 2014 2 0376378 U

(51) Int. Cl.
*A47C 27/08*    (2006.01)
*B29D 22/02*    (2006.01)

(52) U.S. Cl.
CPC .............. *A47C 27/081* (2013.01); *A47C 27/08* (2013.01); *B29D 22/02* (2013.01)

(58) Field of Classification Search
CPC ..... A47C 27/08; A47C 27/081; A47C 27/088
USPC ................... 5/706, 710–713, 655.3, 654, 644
See application file for complete search history.

(56) References Cited

U.S. PATENT DOCUMENTS

| | | | | | |
|---|---|---|---|---|---|
| 2,748,401 | A | * | 6/1956 | Winstead | 5/655.3 |
| 3,533,113 | A | * | 10/1970 | Stamberger | 5/654 |
| 5,533,220 | A | * | 7/1996 | Sebag et al. | 5/654 |
| 6,189,168 | B1 | * | 2/2001 | Graebe | 5/644 |
| 6,402,879 | B1 | * | 6/2002 | Tawney et al. | 156/292 |
| 6,510,573 | B1 | * | 1/2003 | Grabe | 5/644 |
| 6,514,467 | B1 | * | 2/2003 | Bulsink et al. | 422/122 |
| 6,571,490 | B2 | * | 6/2003 | Tawney et al. | 36/29 |
| 6,715,171 | B2 | * | 4/2004 | Grabe | 5/644 |
| 7,132,032 | B2 | * | 11/2006 | Tawney et al. | 156/290 |
| 7,244,483 | B2 | * | 7/2007 | Tawney et al. | 428/35.7 |
| 2001/0042321 | A1 | * | 11/2001 | Tawney et al. | 36/29 |
| 2002/0139471 | A1 | * | 10/2002 | Tawney et al. | 156/205 |
| 2003/0110565 | A1 | * | 6/2003 | Grabe | 5/644 |
| 2003/0183324 | A1 | * | 10/2003 | Tawney et al. | 156/145 |
| 2008/0148489 | A1 | * | 6/2008 | Wu | 5/712 |
| 2015/0157133 | A1 | * | 6/2015 | Lau | A47C 27/08 |

* cited by examiner

*Primary Examiner* — Robert G Santos
(74) *Attorney, Agent, or Firm* — Raymond Sun

(57) ABSTRACT

An inflatable product has a first layer and a second layer, each layer having a peripheral edge, with the first and second layers joined together along their peripheral edges to define an internal space for receiving air or fluid. Each layer has a uniform thickness throughout except that the thickness along the peripheral edge of each layer is greater than the thickness of the rest of the layer. A plurality of tension members can also be provided inside the internal space, each tension member having a first end that is joined to an inner surface of the first layer, and a second end that is joined to an inner surface of the second layer. Each tension member has a uniform thickness throughout except that the thickness along the first and second ends is greater than the thickness of the rest of the tension member.

6 Claims, 18 Drawing Sheets

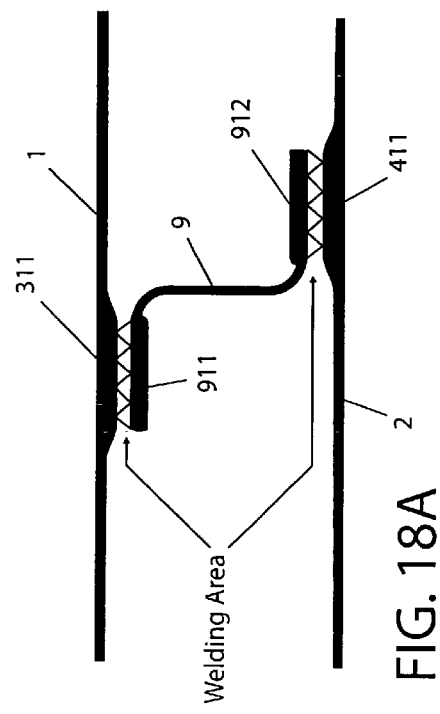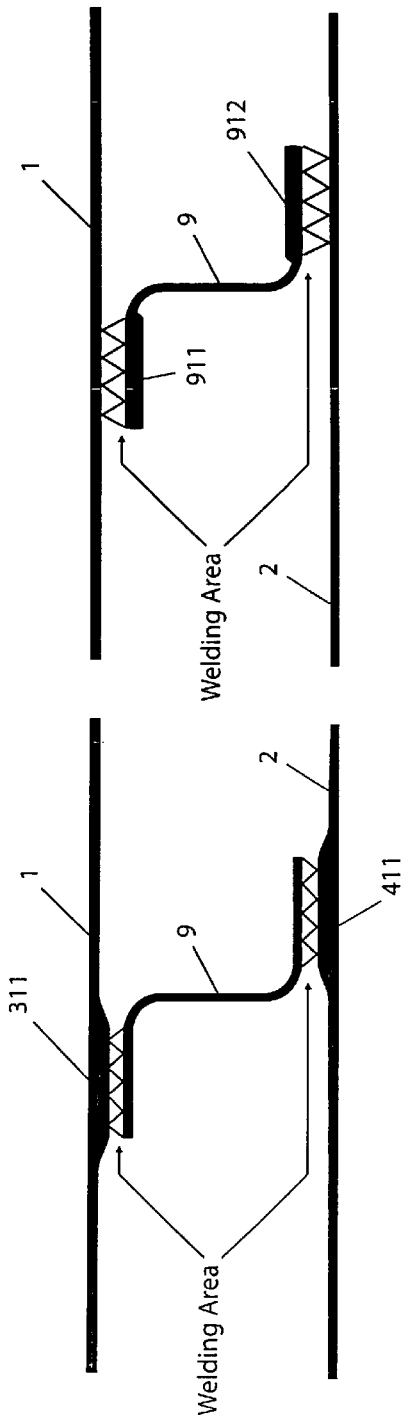

CONNECTING STRUCTURE FOR INFLATABLE PRODUCTS

BACKGROUND OF THE INVENTION

1. Field of the Invention

The present invention relates to an inflatable product, and in particular, to a connection structure for use with inflatable products.

2. Description of the Prior Art

At present, most of the inflatable products on the market are made up of a top layer and a bottom layer, which are made from environmentally friendly materials, such as PVC and TPU. For example, a current inflatable mattress is generally formed of a top layer having a uniform thickness and strength, a bottom layer, connecting coils that function as tension members, and a surrounding material layer. The top layer and the bottom layer are joined all around, through the surrounding material layer, by means of high-frequency welding, to form a sealed air chamber. A plurality of coils or tension members are joined between the top and bottom layers via high-frequency welding. In this manner, after the mattress is inflated, the top and bottom layers are kept flat under the pull of the tension members, so as to form the desired shape for the mattress. The top layer and the bottom layer typically both have a uniform thickness. When such a product is used, the base positions where the tension members are joined with the top and bottom layers are subject to a maximum stress. In addition, because the base positions where two layers having a uniform thickness and strength are joined by high-frequency welding become thinner due to welding, the stress-resistant strength of the base positions is much lower than that of the positions free from such welding. Therefore, the base positions are most likely to be torn during use, and the service life of the product is thus shortened.

Thus, when inflatable products such as mattresses, inflatable pools, inflatable recreational products, life-saving and protecting products, and the like, are manufactured, it is necessary to improve the tensile strength of the base positions where the top layer and the bottom layer are joined, and to ensure that the joints of the top layer and the bottom layer are unlikely to be damaged during welding. One attempt to address this problem is to uniformly increase the overall thickness of the top layer and the bottom layer. However, this uniform increase in thickness increases the weight of resulting product, making it difficult to carry or transport, and also increases the cost of the product.

There remains a need for an improved connection structure for inflatable products that avoids the drawbacks identified above.

SUMMARY OF THE DISCLOSURE

It is an object of the present invention to provide an inflatable product that is durable and simple in construction.

It is another object of the present invention to provide a method for manufacturing an inflatable product that has an improved connection structure between two layers of material.

In order to accomplish the objects of the present invention, there is provided an inflatable product having a first layer and a second layer, each layer having a peripheral edge, with the first and second layers joined together along their peripheral edges to define an internal space for receiving air or fluid. Each layer has a uniform thickness throughout except that the thickness along the peripheral edge of each layer is greater than the thickness of the rest of the layer.

A plurality of tension members can also be provided inside the internal space, each tension member having a first end that is joined to an inner surface of the first layer, and a second end that is joined to an inner surface of the second layer. Each tension member has a uniform thickness throughout except that the thickness along the first and second ends is greater than the thickness of the rest of the tension member.

The present invention also provides a method of making the layers that have varying thicknesses. The present invention provides a first calendaring roller having a circular roller body, and a plurality of annular grooves provided in spaced-apart manner along the length of the roller body, and a second roller having a uniform smooth surface. The first roller is positioned from the second roller with a gap between the two rollers, and then a material is passed through the gap to create an extruded layer having thickened sections at the locations where the grooves are positioned along the first roller.

In accordance with an embodiment of the present invention, the product is an inflatable mattress.

BRIEF DESCRIPTION OF THE DRAWINGS

FIGS. 18A-C illustrate three different ways of welding or joining another type of I-Beam two layers of material.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
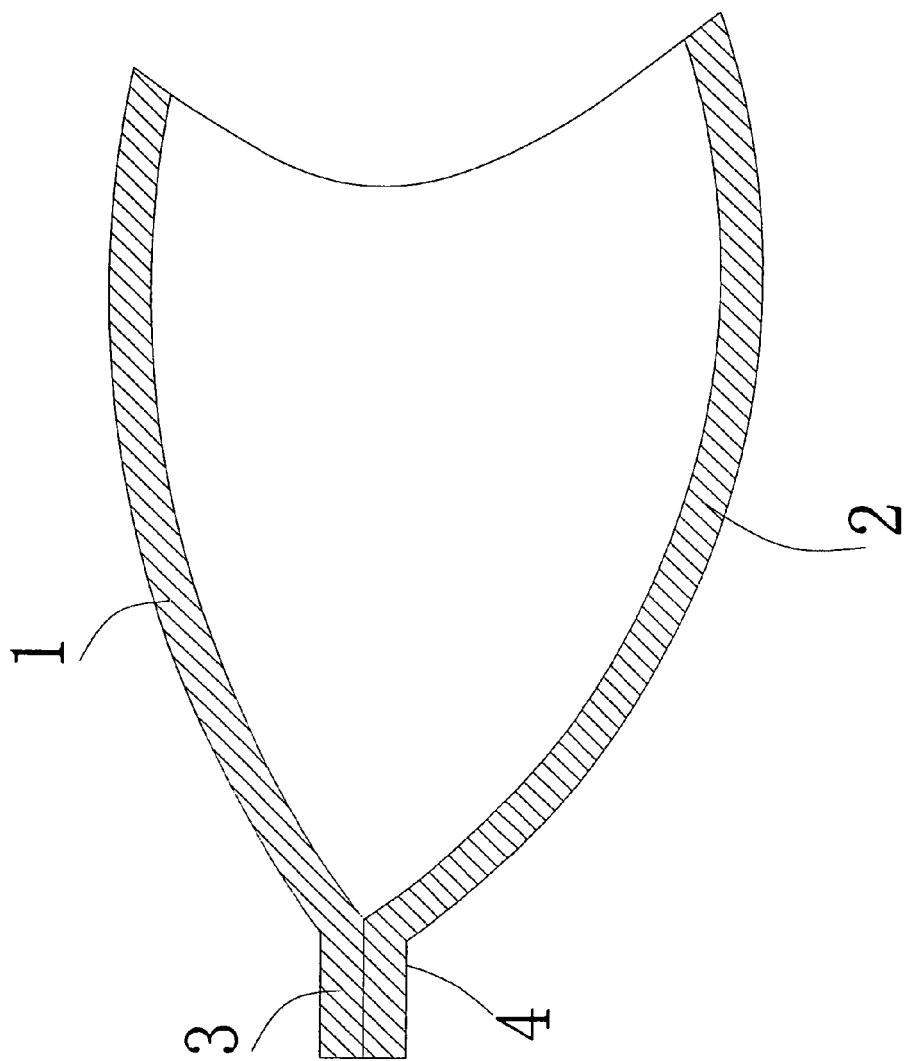
FIG. 1 is a schematic view of portions of a top layer and a bottom layer of an inflatable product according to the present invention, before being joined around its side edges by high frequency welding

Referring to FIG. 1, the present invention provides a connecting structure for inflatable products that have a top layer 1 and a bottom layer 2. Thickened extensions 3 and 4 extend along the edges of the top layer 1 and the bottom layer 2, respectively, and these extensions 3 and 4 are welded together along the bordering edges of the top and bottom layers 1 and 2 so as to form a sealed air-filled space. The thicknesses of the extensions 3 and 4 can be 0.01-0.06 mm greater than the thickness along the rest of the layers 1 and 2. The top layer 1 and the bottom layer 2 may be joined by means of high frequency welding, directly or indirectly. By providing only the welded portions of the layers 1 and 2 to be thicker than the other parts of the layers 1 and 2, the overall thickness of the layers 1 and 2 can be reduced, thereby reducing the production cost and the overall weight of the product.

Figure 2:
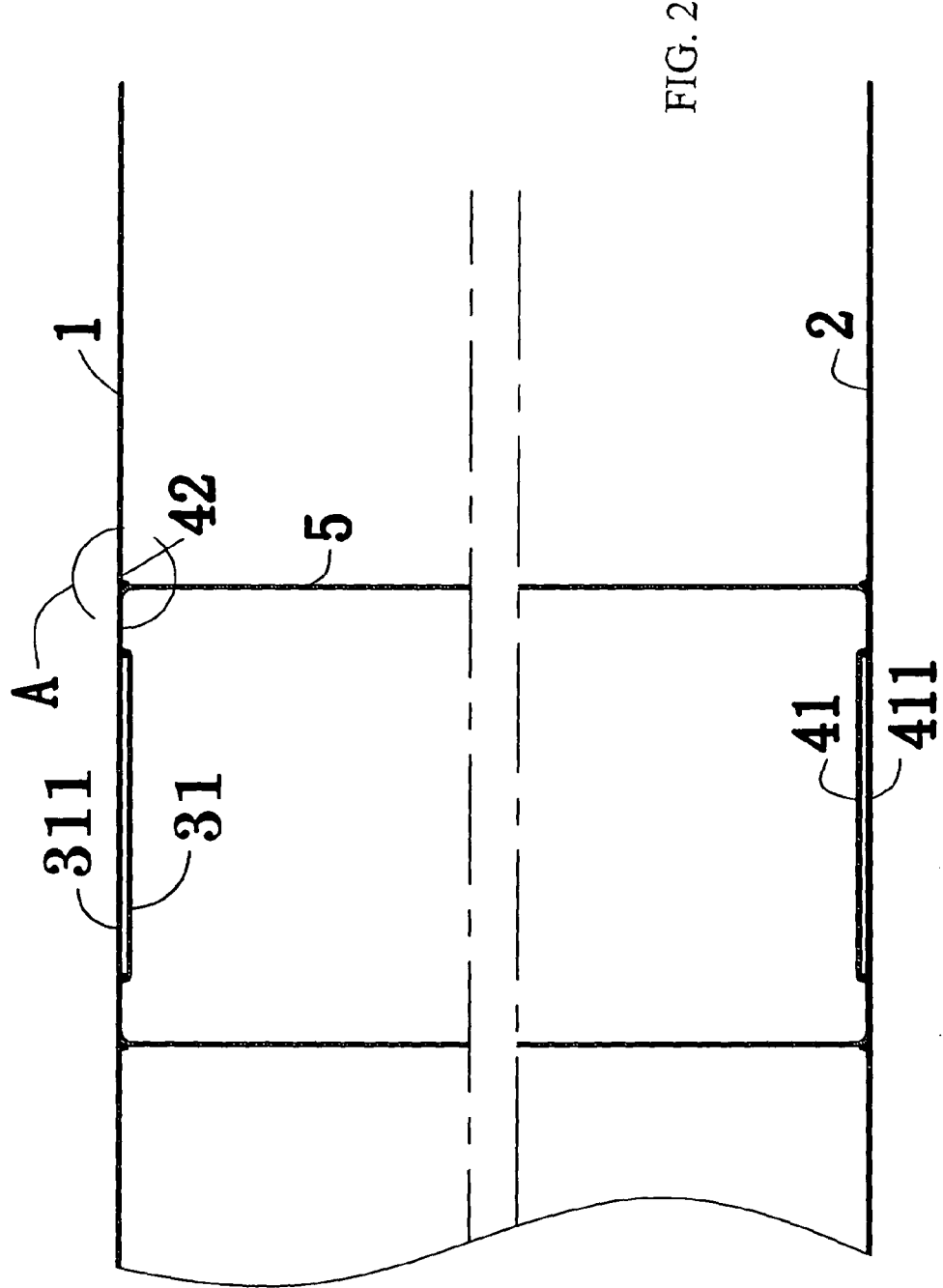
FIG. 2 is a cutaway cross-section view of a portion of the inflatable product of FIG. 1 before welding.
Figure 3:
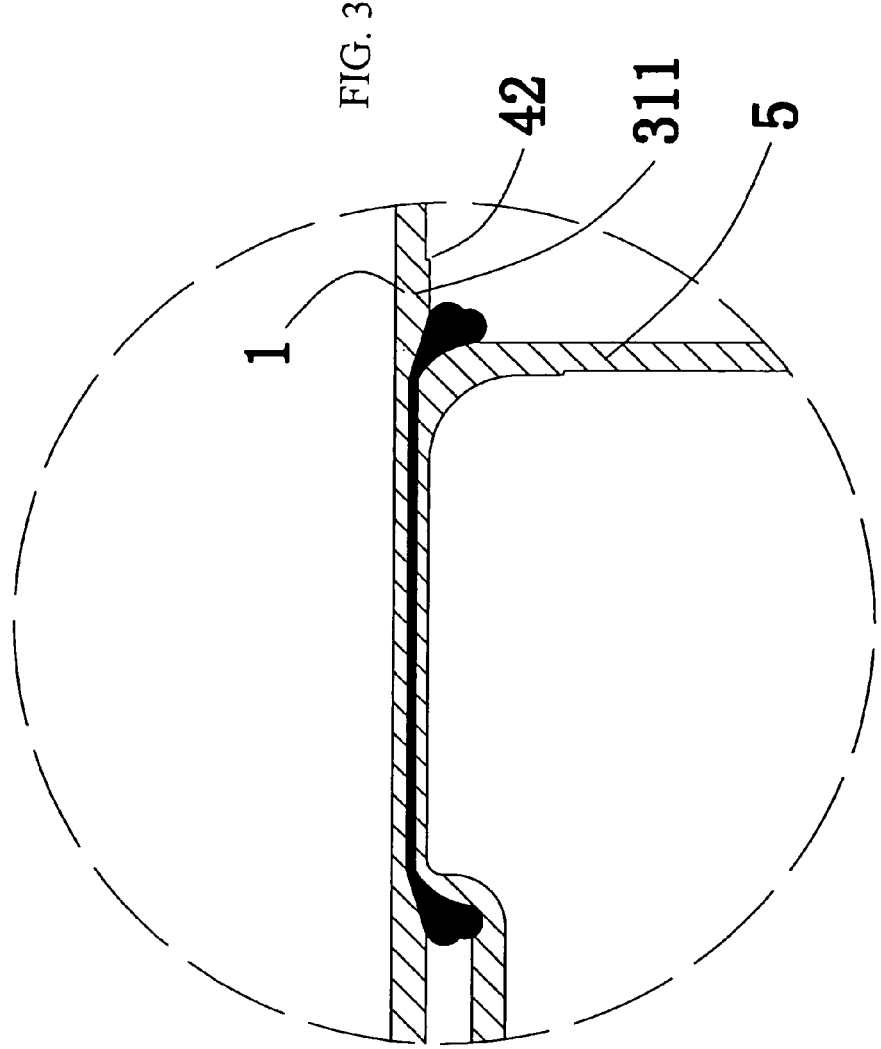
FIG. 3 is an enlarged view of the part A in FIG. 2.
Figure 4:
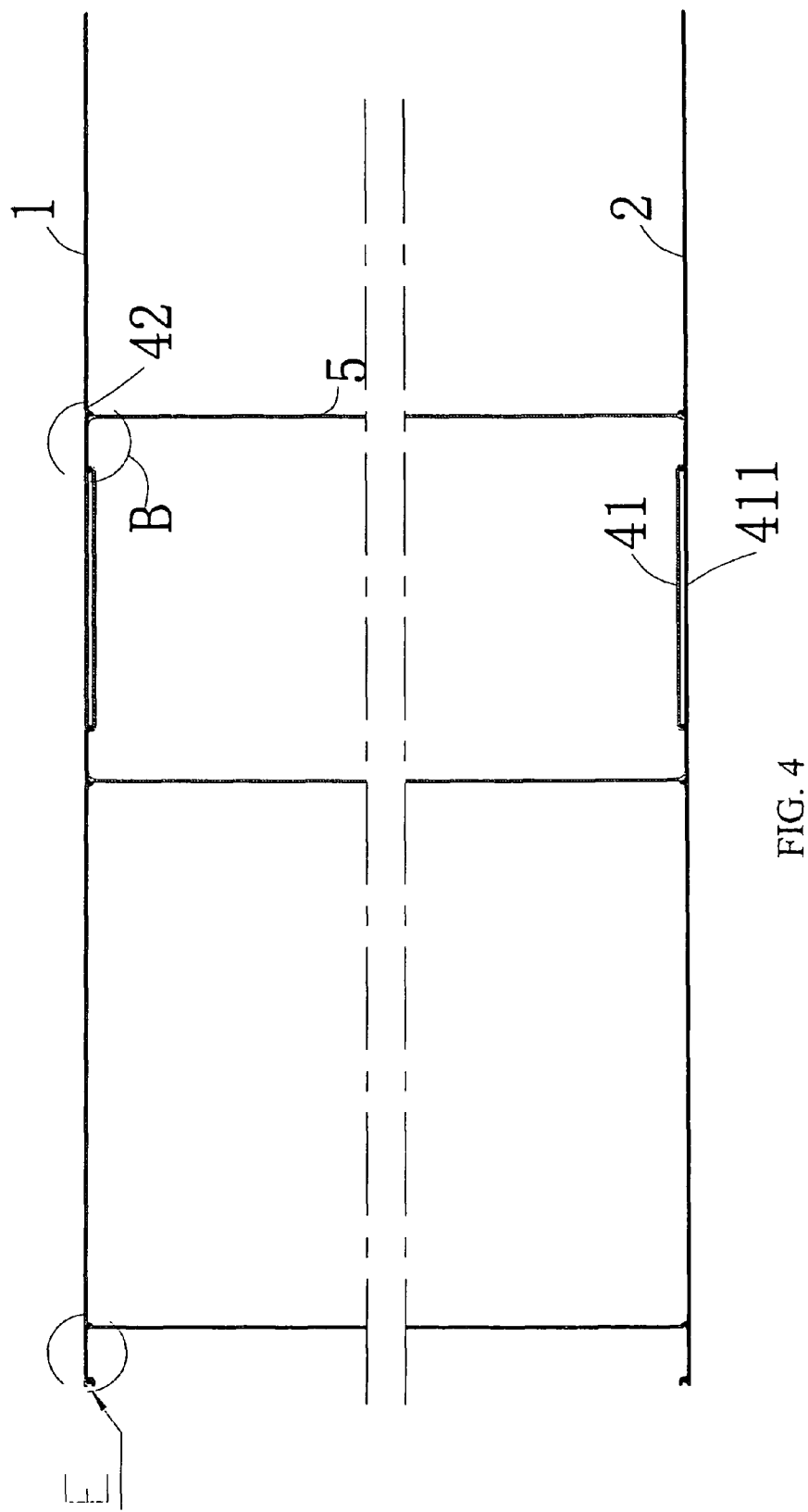
FIG. 4 is a schematic view of the inflatable product of FIGS. 1-2 after welding.
Figure 5:
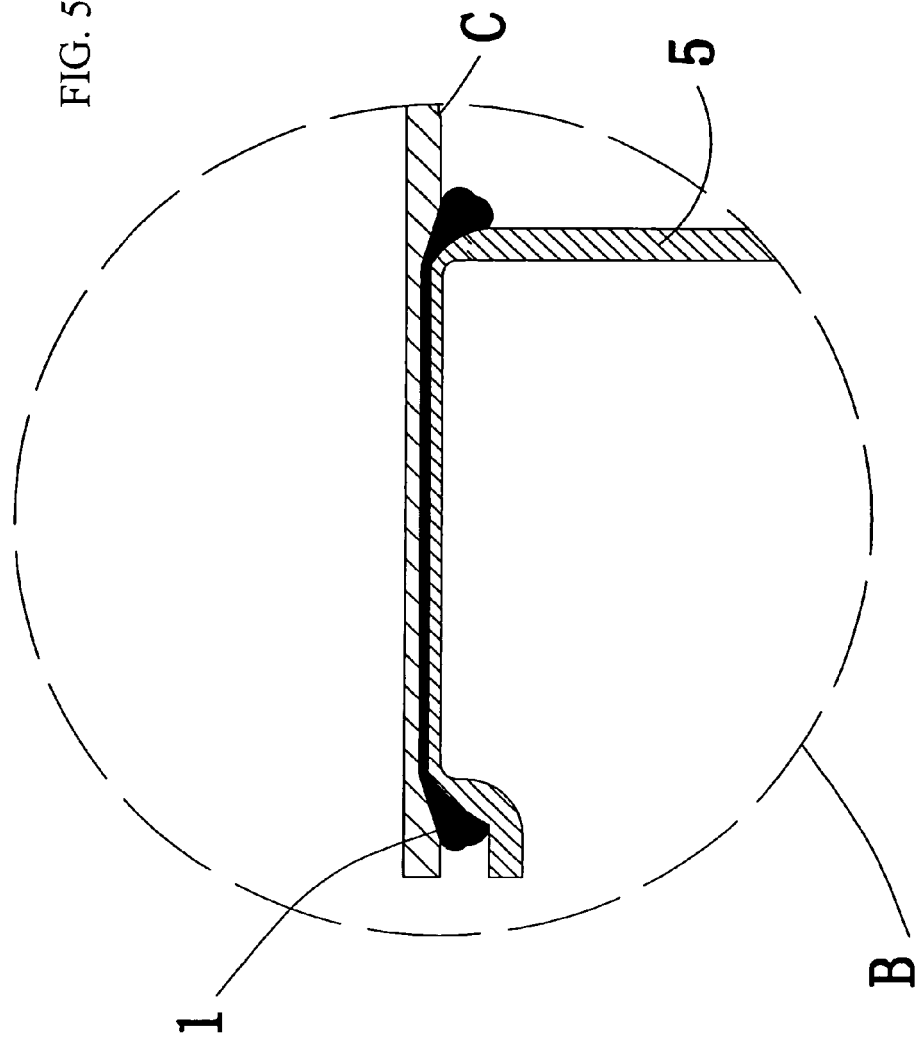
FIG. 5 is an enlarged view of the part B of FIG. 4.
Figure 7:
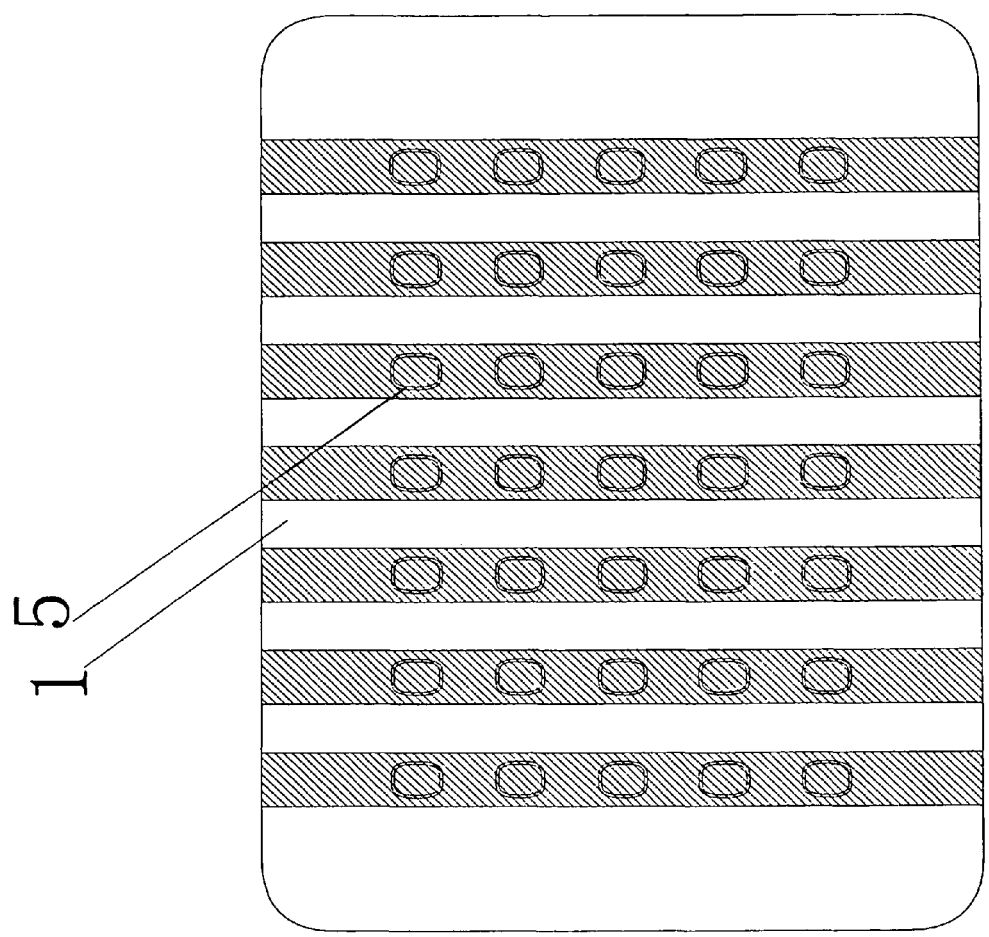
FIG. 7 is a top plan view of the inflatable product of the present invention, embodied as a mattress.
Figure 8:
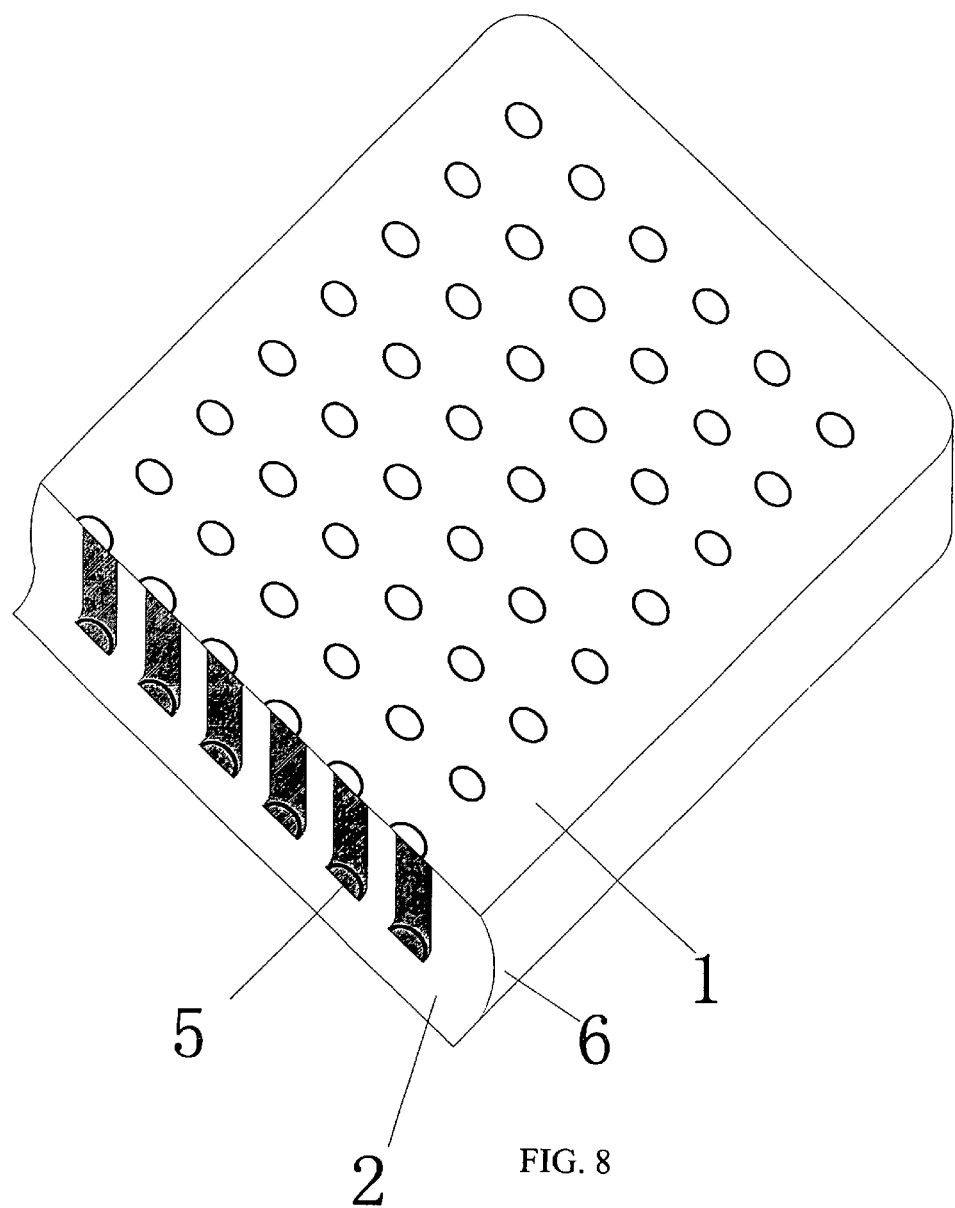
FIG. 8 is a perspective cut-away view of the inflatable product of FIG. 7.

The connecting structure of the present invention can be used for inflatable mattresses, examples of which are shown in FIGS. 7 and 8. When used for inflatable mattresses, the top and bottom layers 1 and 2 also need to be joined via the use of tension members 5 that have opposite ends welded to the inner surfaces of the layers 1 and 2. These tension members 5 are necessary to allow the mattress to be properly shaped. Specifically, after the mattress is inflated, the layers 1 and 2 are kept flat under the pulling of the tension members 5. The tension members 5 can be joined between the layers 1 and 2 by means of high frequency welding. The tension members 5 can be arranged in a matrix (or other arrangement) as shown in FIGS. 7 and 8. The opposite ends of the tension members 5 are also provided with thickened end parts 31 and 41 for welding to thickened sections 311 and 411 provided on the inner surfaces of the top and bottom layers 1 and 2, as shown in FIGS. 2-4. The end parts 31 and 41 can be thickened and elongated, and take on any shape (e.g., circular, elliptic, square or the like). The sections 311 and 411 can also be thickened and elongated, and take on any shape (e.g., circular, elliptic, square or the like), to correspond to the end parts 31 and 41.

For such a mattress, the thickness of the layers 1 and 2 is preferably about 0.3 mm (within a preferred range of 0.1-0.8 mm, which varies depending on different products), and the thickness of the sections 311 and 411 is preferably about 0.35 mm (within a preferred range of 0.1-0.8 mm, which varies depending on different products), so that the sections 311 and 411 can be joined by means of high frequency welding in a convenient manner while improving the tensile strength.

For the mattress described above, a chamfer 42 is provided at a position where a thickened section 311 or 411 is in transition with the normal material of the layer 1 or 2. In addition, for such a mattress, the radius R1 of the chamfer 42 can be 0.01 mm (see FIG. 6). The purpose of the chamfer 42 is to avoid any sharp corners at the positions of corners and edges.

Figure 6:
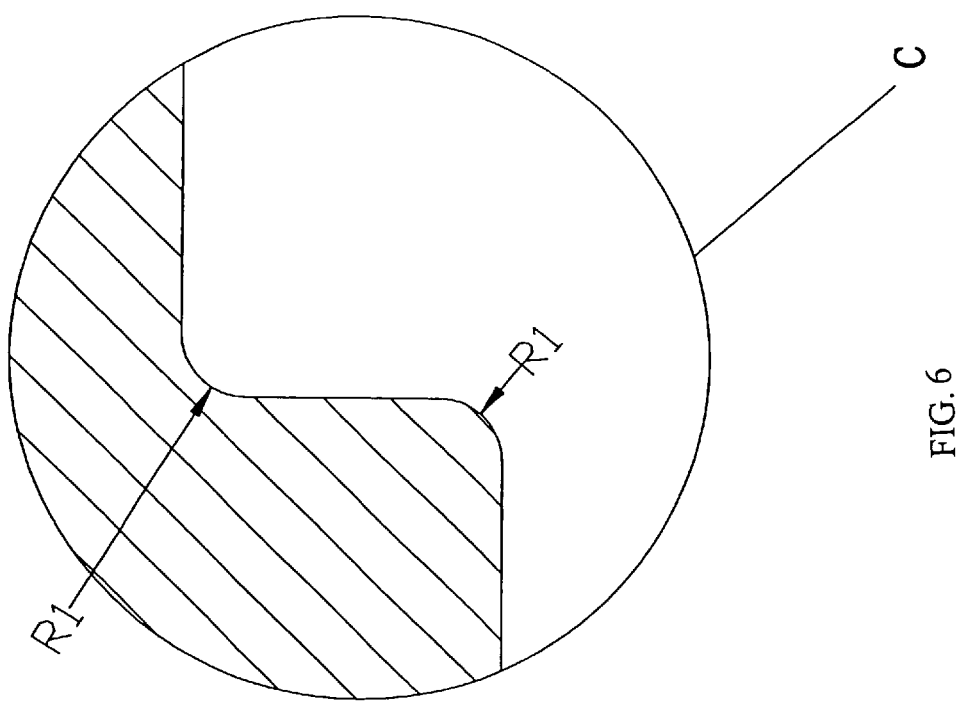
FIG. 6 is an enlarged view of the part C of FIG. 5.

As shown in FIG. 6, bulges at the parts for welding in the layers 1 and 2 are designed to be round or curved corners. This provides a uniform stress on the parts that are welded, and therefore improves the tensile strength. As a result, the resulting mattress (or product) is uniformly stressed after being inflated, and the base positions where the tension members 5 are joined to the layers 1 and 2 are unlikely to be torn. As a result, the mattress or product can enjoy improved durability and a longer service life.

The present invention provides a roller processing mold and method that creates the unique layers 1 and 2 with thickened sections 3, 4, 31, 41, 311 and 411, and also provides a method for welding the thickened sections together.

Figure 9:
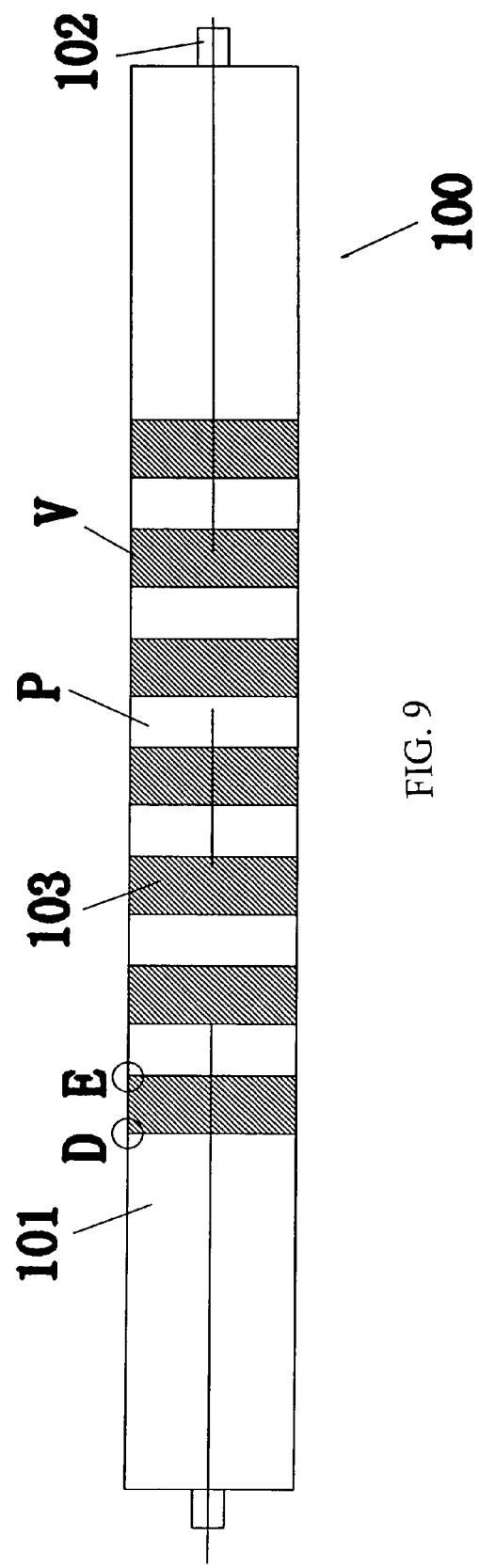
FIG. 9 is a schematic view of a material calendaring roller according to the present invention.

Referring to FIG. 9, a material calendaring roller 100 is provided, which includes a circular roller body 101 that is adapted to contact the surface of a layer 1 or 2 of material, a rotating shaft 102 being correspondingly provided at both ends of the circular roller body 101, and a plurality of annular grooves 103 provided in spaced-apart manner along the length of the roller body 101. The provision of these grooves 103 creates peaks and valleys along the length of the roller body 101, so that a layer 1 or 2 of material that is passed through this roller body 101 will have corresponding peaks P (thickened sections) and valleys V (sections with lesser thickness) configured or arrayed according to the pattern laid out on the surface of the circular roller body 1.

Figure 10:
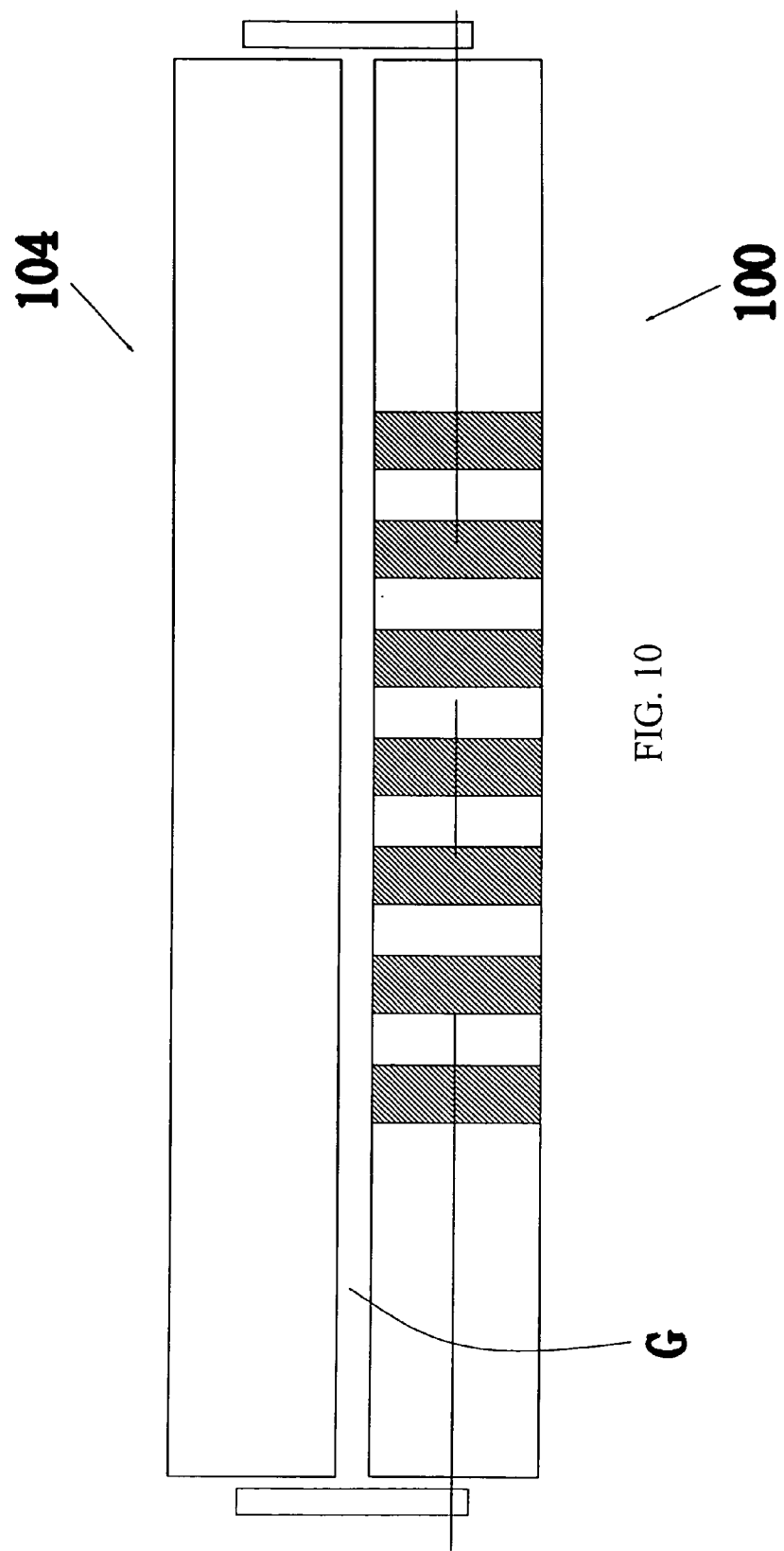
FIG. 10 illustrates the calendaring roller of FIG. 9 in use with another roller with a uniformly smooth surface.

Referring to FIG. 10, when in use, the circular roller body 100 can be used in connection with another roller body 104 which has a completely uniform smooth surface. A certain gap G is maintained between the circular roller body 100 and the surface of the other roller body 104, so that the calendared material can be extruded from this gap. In this way, the extruded material will contact the annular grooves 103 and be filled into the annular grooves 103, thereby creating sections with a greater thickness at the locations of the annular grooves 103.

Figure 11:
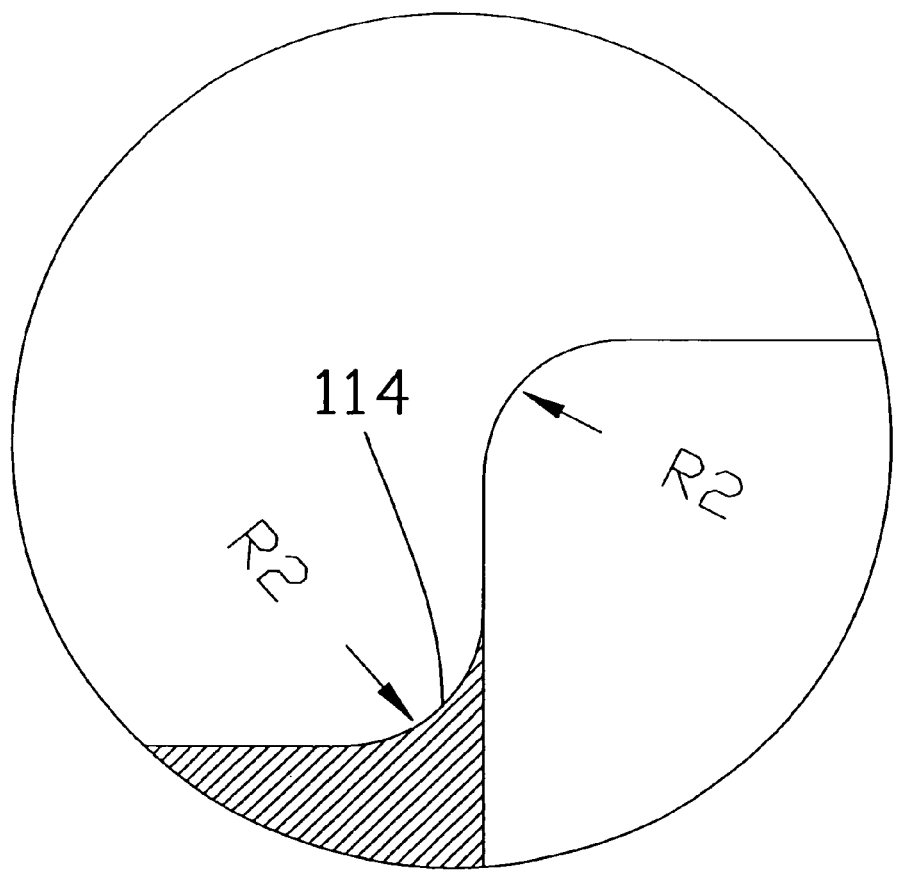
FIGS. 11 and 12 are enlarged views of parts D and E of FIG. 9, respectively.
Figure 12:
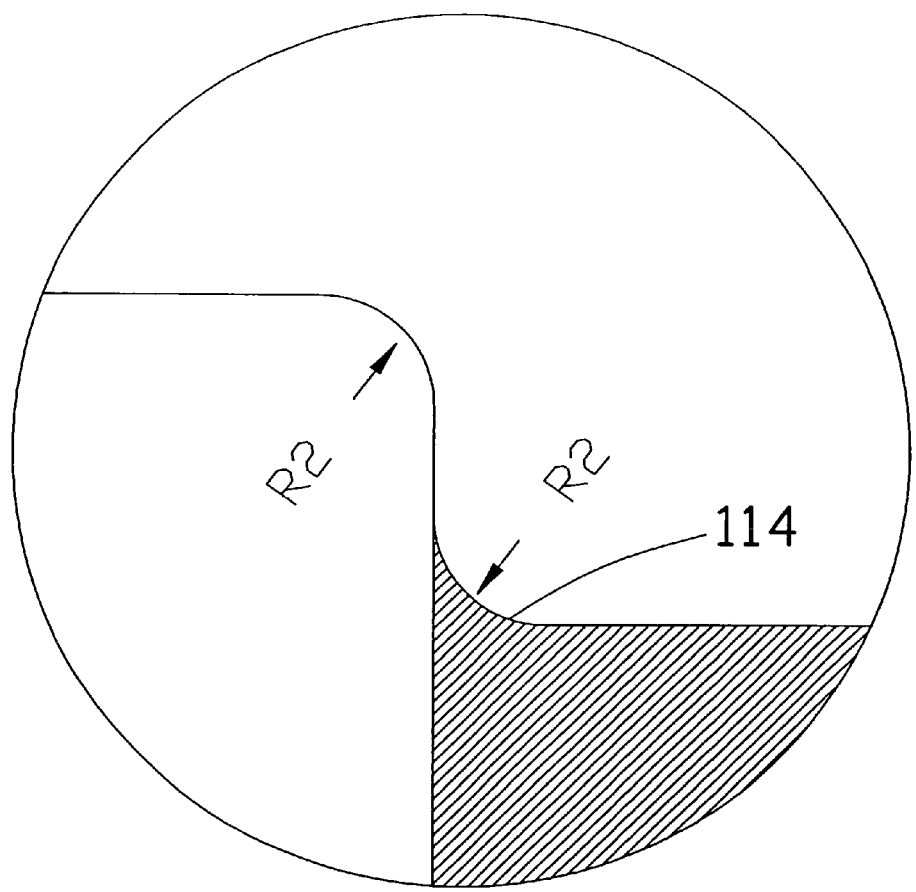
Figure 13:
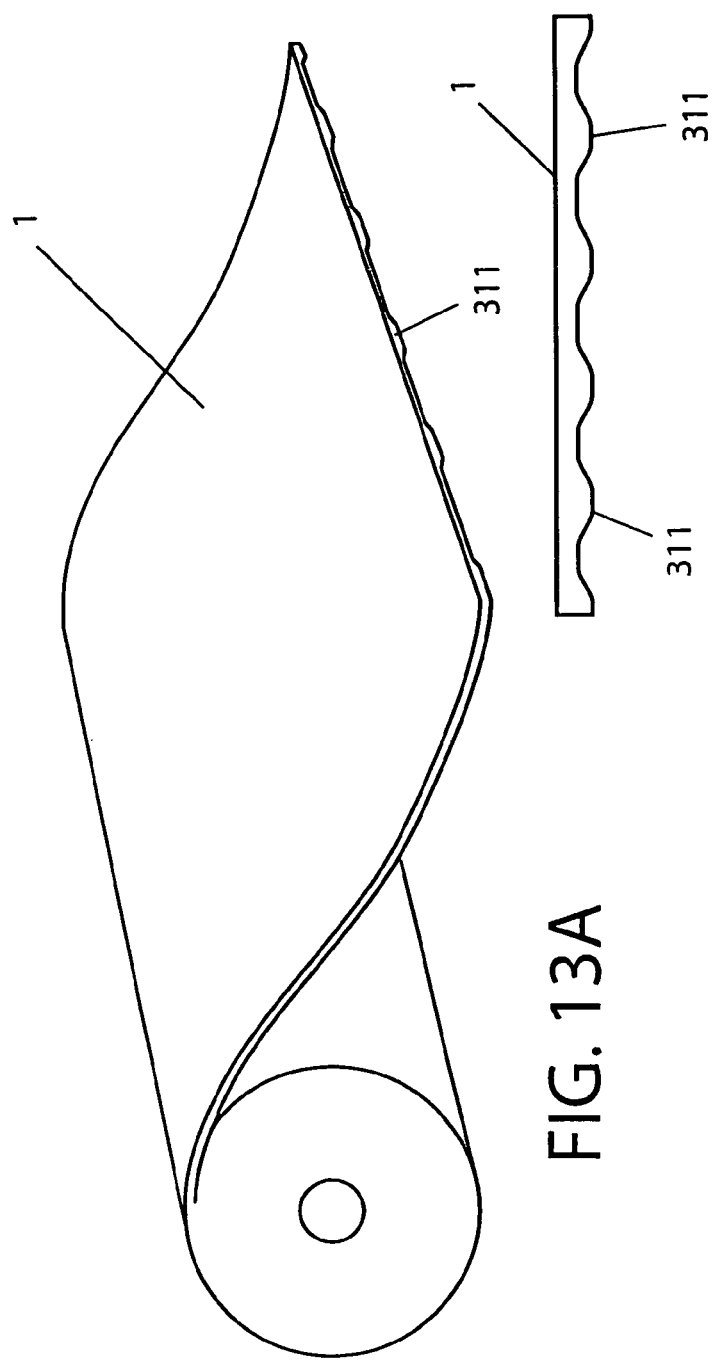
FIG. 13A illustrates a layer of material that is extruded from the roller of FIG. 9.
FIG. 13B is a cross-sectional view of the layer of material of FIG. 13A.
Figure 14:
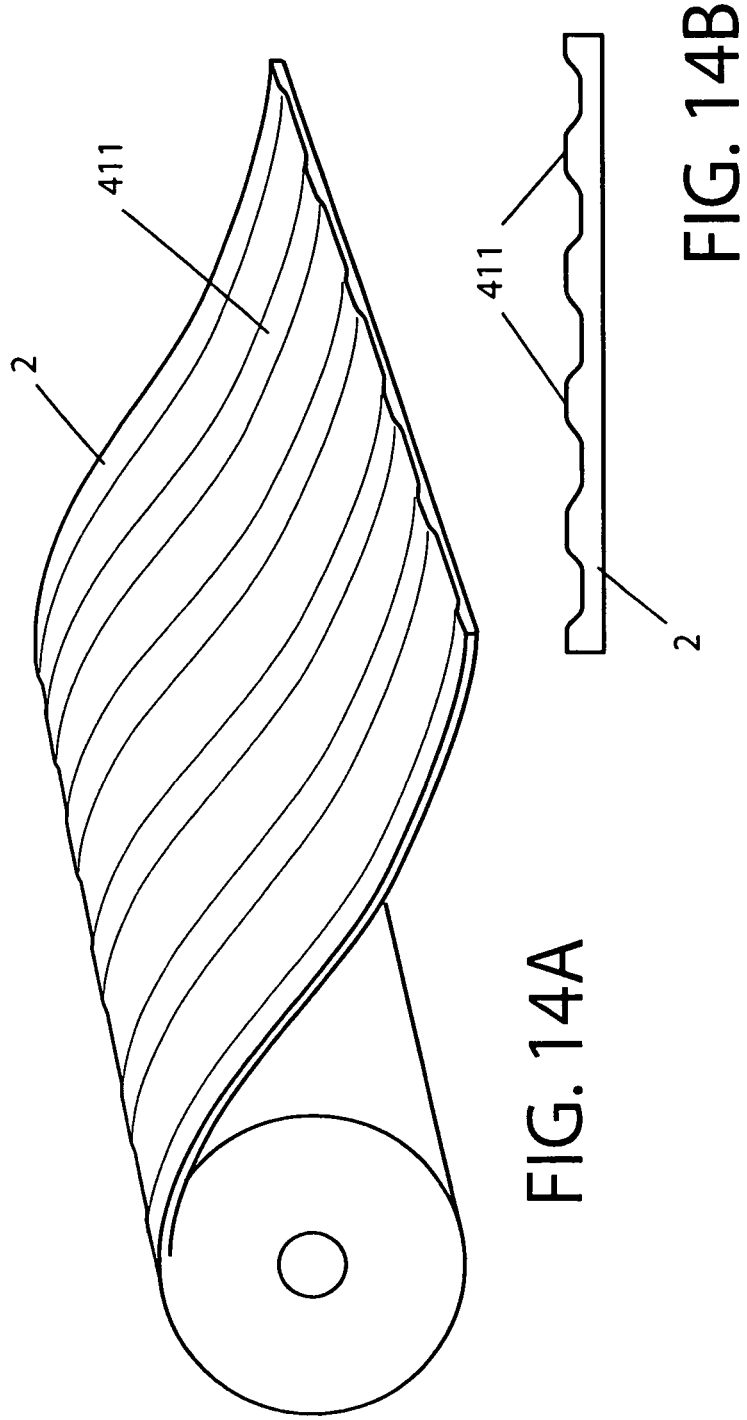
FIG. 14A illustrates another layer of material that can be extruded from the roller of FIG. 9.
FIG. 14B is a cross-sectional view of the layer of material of FIG. 14A.

In one embodiment of the present invention, the depth or height H of the annular grooves 103 is 0.01-0.06 mm, and preferably 0.03 mm. See FIGS. 11-12. The height H of 0.03 mm can vary based on the product on which the extruded layers 1 and 2 are to be used. For example, this preferred height can be used for inflatable mattresses.

A chamfer 114 is provided at a location where the annular grooves 103 transition to the surface of the circular roller body 101. In this way, the annular groove 103 and the surface of the circular roller body 101 are in natural transition, thereby providing a smooth transition, so that the resulting product has naturally transitioned thickened sections and non-thickened sections, without any sharp corners or edges, while experiencing uniform stress throughout. In a preferred embodiment, the radius R2 of the chamfer 114 is 0.01 mm. Although the adjacent annular grooves 103 are shown herein as being spaced apart from each other in equal distances, the spacing between the adjacent annular grooves 103 can be adjusted and varied depending on the product and application.

FIGS. 13A-13B and 14A-14B illustrate the resulting layers 1 and 2, respectively, that are extruded using the roller 100.

Figure 15:
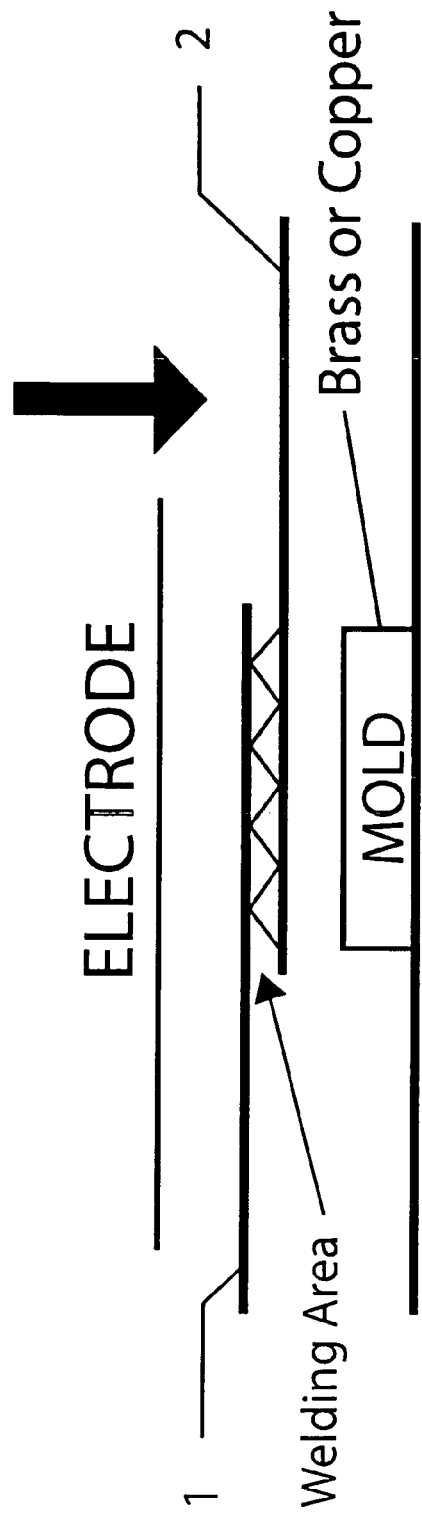
FIG. 15 illustrates how the thickened sections of the present invention are welded together.

FIG. 15 illustrates how high frequency welding is used to weld together thickened sections 1 and 2 of FIG. 1 according to the present invention. The layers 1 and 2 are placed between a conventional brass/copper mold and an electrode, and then the combined layers 1 and 2 are passed through this space between the mold and the electrode. The same technique and roller 100 can be used to extrude any of the tension members 5 or beams 7 and 9 shown in FIGS. 16-18.

Figure 16A:
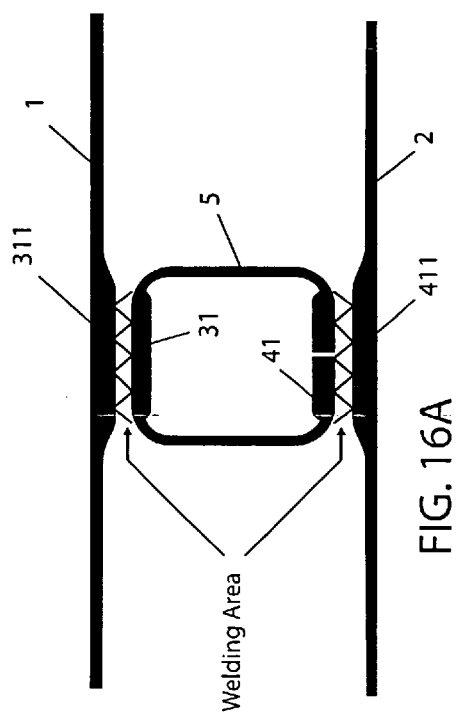
FIGS. 16A-C illustrate three different ways of welding or joining a tension member to two layers of material.
Figure 16C:
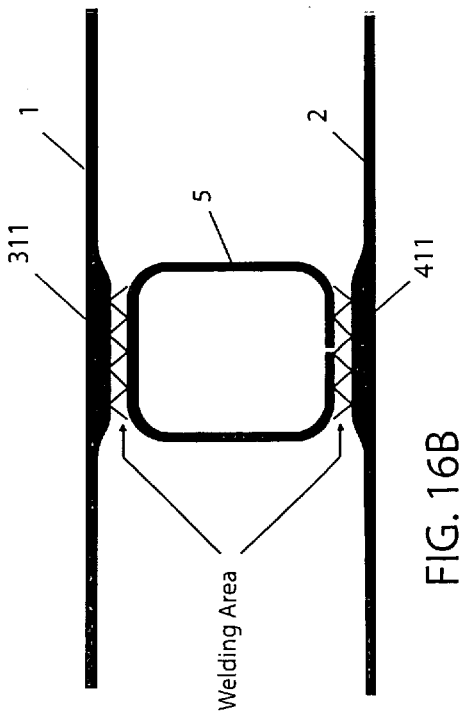
Figure 16B:
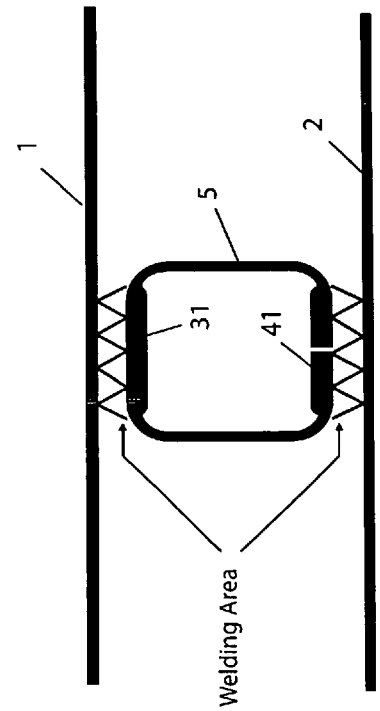

FIGS. 16A-C illustrate three different ways of welding or joining a tension member 5 to layers 1 and 2. In FIG. 16A, both the layers 1 and 2 and the both ends 311 and 411 of the tension member 5 can be provided with thickened sections, and then the thickened ends 31 and 41 are welded to the thickened sections 311 and 411, respectively. In FIG. 16B, the tension member 5 is not provided with any thickened ends, so that only the thickened sections 311 and 411 are joined to opposite ends of the tension member 5. Conversely, in FIG. 16C, the layers 1 and 2 are not provided with any thickened sections, so only the thickened ends 31 and 41 are joined to the layers 1 and 2 having uniformed thickness.

The I-Beams 7 and 9 can be used as alternatives to the tension members 5 when joining between the layers 1 and 2. The I-beams 7 and 9 perform the same function as the tension members.

Figure 17A:
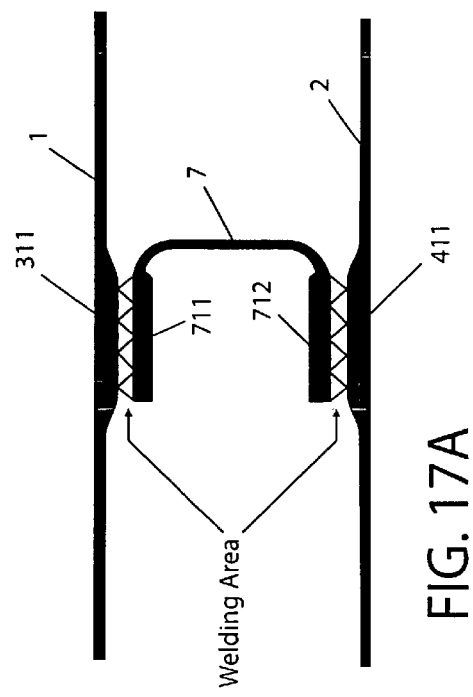
FIGS. 17A-C illustrate three different ways of welding or joining one type of I-Beam two layers of material.
Figure 17C:
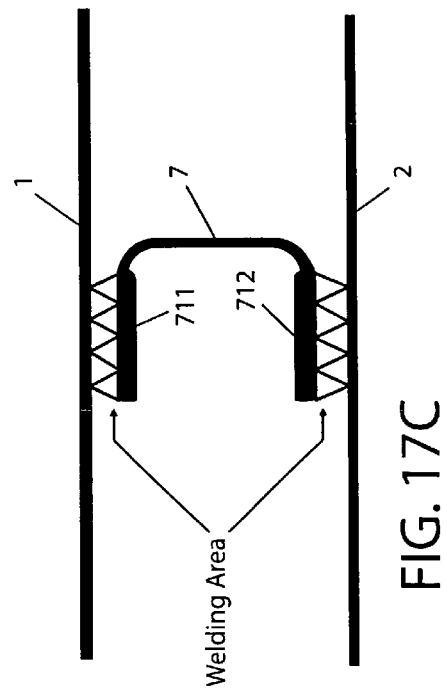
Figure 17B:
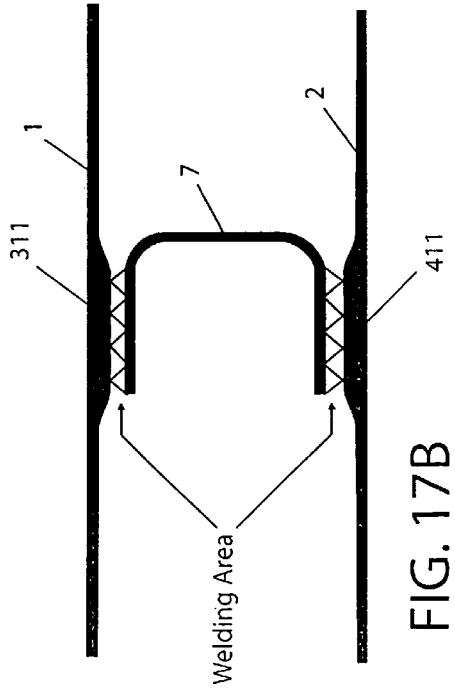

FIGS. 17A-C illustrate three different ways of welding or joining an I-beam 7 to layers 1 and 2. In FIG. 17A, both the layers 1 and 2 and the both ends 711 and 712 of the I-Beam 7 can be provided with thickened sections, and then the thickened ends 711 and 712 are welded to the thickened sections 311 and 411, respectively. In FIG. 17B, the I-Beam 7 is not provided with any thickened ends, so that only the thickened sections 311 and 411 are joined to opposite ends of the I-Beam 9. Conversely, in FIG. 17C, the layers 1 and 2 are not provided with any thickened sections, so only the thickened ends 711 and 712 are joined to the layers 1 and 2 having uniformed thickness.

FIGS. 18A-C illustrate three different ways of welding or joining a different type of I-beam 9 to layers 1 and 2. In FIG. 18A, both the layers 1 and 2 and the both ends 911 and 912 of the I-Beam 9 can be provided with thickened sections, and then the thickened ends 811 and 812 are welded to the thickened sections 311 and 411, respectively. In FIG. 18B, the I-Beam 9 is not provided with any thickened ends, so that only the thickened sections 311 and 411 are joined to opposite ends of the I-Beam 9. Conversely, in FIG. 18C, the layers 1 and 2 are not provided with any thickened sections, so only the thickened ends 911 and 912 are joined to the layers 1 and 2 having uniformed thickness.

The present invention provides the following benefits. First, due to the fact that the thickened sections or parts are limited solely to the locations of the joints, the material throughout the rest of the product can be maintained at a minimum, thereby saving on material cost, and allowing the product to be as lightweight as possible. By locating the joints at the thickened sections or parts, better tensile strength is realized after welding, leading to a more durable product. In addition, the construction and manufacturing process are kept as simple as possible.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. An inflatable product, comprising:
   a first layer and a second layer, each layer having a periphery, with the first and second layers joined together along their peripheries to define an internal space for receiving air or fluid, wherein each layer has a uniform thickness throughout except that the thickness along the periphery of each layer is greater than the thickness of the rest of the layer so as to improve the tensile strength at the locations where the first layer and the second layer are joined.

2. The product of claim 1, wherein the product is an inflatable mattress.

3. The product of claim 1, further including a plurality of tension members provided inside the internal space, each tension member having a first end that is joined to an inner surface of the first layer, and a second end that is joined to an inner surface of the second layer, wherein each tension member has a uniform thickness throughout except that the thickness along the first and second ends is greater than the thickness of the rest of the tension member.

4. An inflatable product, comprising:
   a first layer and a second layer, each layer having a periphery, with the first and second layers joined together along their peripheries to define an internal space for receiving air or fluid;
   a plurality of tension members provided inside the internal space, each tension member having a first end and a second end, wherein each tension member has a uniform thickness throughout except that the thickness along the first and second ends is greater than the thickness of the rest of the tension member;
   wherein each layer further includes a plurality of connection sections provided on an inner surface of each layer that correspond to the locations of the first and second ends of the tension members; and
   wherein each layer has a uniform thickness throughout except that the thickness along the periphery of each layer, and at the connection sections, are greater than the thickness of the rest of the layer so as to improve the tensile strength at the connection sections, and at the locations where the first layer and the second layer are joined.

5. The product of claim 4, wherein the product is an inflatable mattress.

6. The product of claim 4, wherein a chamfer is provided at a position where each connection section is in transition with the material of each layer.

* * * * *